D. L. CHESTNUT.
DEVICE FOR RESTORING TROLLEY WHEELS TO TROLLEY WIRES.
APPLICATION FILED SEPT. 17, 1921.
1,414,548.  Patented May 2, 1922.
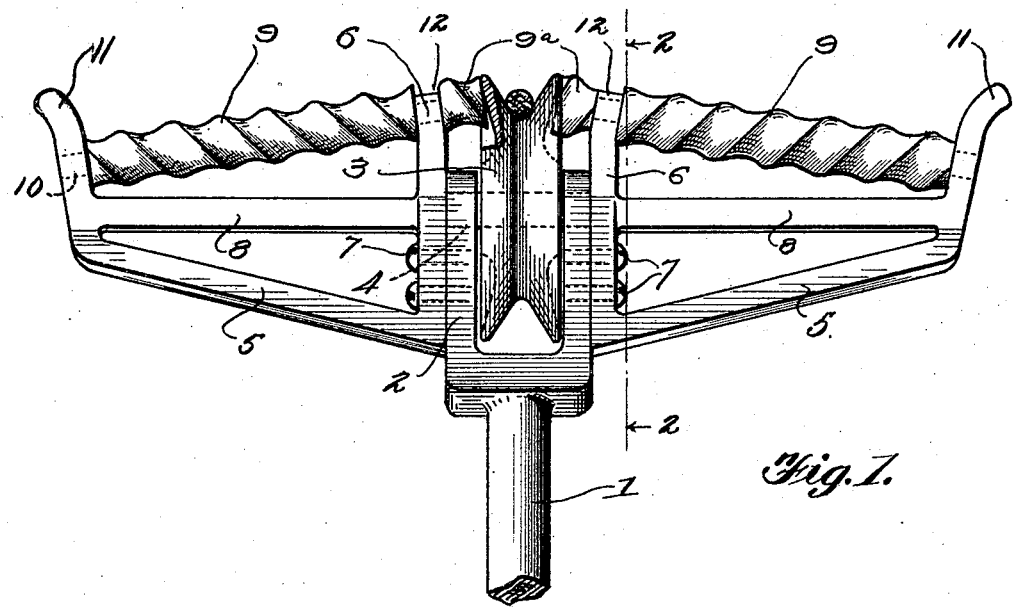
Fig. 1.
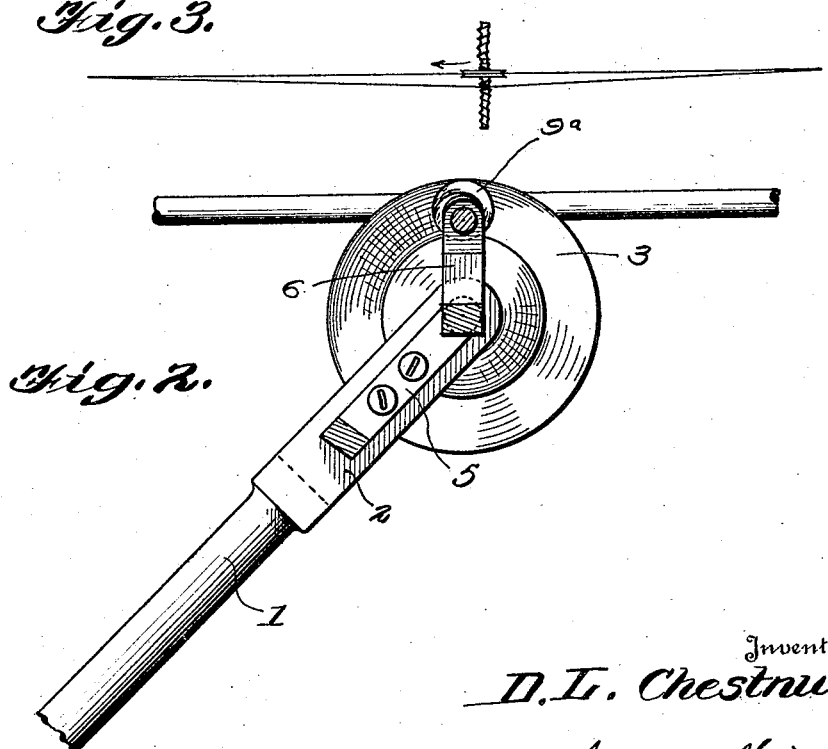
Fig. 3.
Fig. 2.
Inventor
D. L. Chestnut.
By Fred P. Fori
Attorney

UNITED STATES PATENT OFFICE.

DONALD L. CHESTNUT, OF SEATTLE, WASHINGTON.

DEVICE FOR RESTORING TROLLEY WHEELS TO TROLLEY WIRES.

1,414,548.  Specification of Letters Patent.  Patented May 2, 1922.

Application filed September 17, 1921. Serial No. 501,266.

*To all whom it may concern:*

Be it known that DONALD L. CHESTNUT, a citizen of the United States, residing at Seattle, in the county of King and State of Washington, has invented certain new and useful Improvements in Device for Restoring Trolley Wheels to Trolley Wires, of which the following is a specification.

This invention relates to improvements in devices for automatically replacing a trolley wheel on a trolley wire after it has jumped off.

An object of the invention is to attach brackets to a trolley harp which rotatably supports spiral members adapted to engage the trolley wire after the wheel jumps off of it, and in the rotation thereof on the wire, pull the trolley wheel over and reseat it on the wire.

Other objects and the details of construction are specifically pointed out in the following description and claims.

In the drawings:

Fig. 1 is a front elevation of a trolley harp and wheel with the invention applied.

Fig. 2 is a sectional view on line 2—2 of Fig. 1.

Fig. 3 is a plan view showing the spiral member engaging the trolley wire for replacing the wheel on the wire.

1 indicates a trolley pole of usual construction formed at the upper end into a harp 2, rotatably supporting trolley wheel 3 on axle 4.

The invention comprises a pair of brackets 5 having vertical straight portions 6, adapted to abut the harp 2 on opposite sides and extend outwardly therefrom in opposite directions as shown. Bolts 7 are passed through portions 6 of the brackets for securing them to the harp. A brace bar 8 is formed with each bracket to make the device inexpensive to manufacture and yet provide a rigid structure.

The portions 6 of the brackets are formed at the upper ends to provide bearings for spiral members 9, and the brackets are formed at the outer ends with bearings 10 for the outer ends of the spiral members 9, and have extensions 11 above the bearings forming guard projections for engaging the wire if the trolley jumps too far beyond the wire and from jumping off the spiral members.

The spiral members 9 are supported in each bracket at an angle, so that the outer end is below the horizontal plane of the upper portion of the trolley wheel. The members are supported this way as shown in the drawings, so they will clear the supports for the trolley wire. The spiral members are cut away as shown at 12 to fit in the bearing in the vertical portions 5 leaving a short spiral portion 9ª, the end of which extends adjacent the edge of trolley wheel 3 at the top portion.

In use, when the wheel 3 jumps off the wire, the pole will immediately tend to move upwardly, due to the spring structure at the lower end (not shown), so that one of the spirals 9 will engage the wire which will cause the spiral to rotate therewith. The wire will seat in the groove of the spiral which is formed so that as it rotates, the wire will ride in the groove towards the trolley wheel. This action will pull the pole and wheel toward the wire, and when it reaches the end of the groove in the spiral, the wire will seat in the groove of the wheel, and the trolley will be replaced.

What I claim is:

1. A trolley replacer, comprising a trolley pole having a harp formed at the uper end, a trolley wheel rotatably mounted in the harp, brackets secured to and extending from opposite sides of the harp, and spiral members rotatably mounted in the brackets and each having one end extending over the end of the harp and terminating in close proximity to the upper edge of said trolley wheel for positively feeding a trolley wire into the wheel.

2. A trolley replacer, comprising a pole formed with a harp at the upper end, a trolley wheel rotatable in said harp, a pair of brackets having vertical portions, the brackets having their vertical portions secured to the harp on opposite sides of the wheel and extending therefrom in opposite directions, the upper end of the vertical portion of each bracket being formed into a bearing and the outer end portions of the brackets being formed with bearings and guard extensions above the bearings, and spiral members mounted to rotate in the bearings of each bracket and having one end extending in close proximity to the upper periphery of the trolley wheel, said spirals being adapted to engage a trolley wire and feed it into the trolley wheel.

In testimony whereof I affix my signature.

DONALD L. CHESTNUT.